United States Patent [19]

Wandt et al.

[11] Patent Number: 5,424,725
[45] Date of Patent: Jun. 13, 1995

[54] BATTERY RETAINER WITH INTEGRAL MECHANICAL SHOCK ISOLATION

[75] Inventors: Henry Wandt, Boca Raton; Gerald E. Brinkley, West Palm Beach; Charles Actor, Boynton Beach, all of Fla.

[73] Assignee: Motorola, Inc., Schaumburg, Ill.

[21] Appl. No.: 22,581

[22] Filed: Feb. 25, 1993

[51] Int. Cl.6 .............................................. G08B 5/22
[52] U.S. Cl. .............................. 340/825.44; 455/351
[58] Field of Search ................. 340/825.44, 825.48, 340/311.1; 455/351, 90, 347–349, 38.2; 429/96, 97, 100; 220/346; 341/27; 315/92; 381/68.4

[56] References Cited

U.S. PATENT DOCUMENTS

| | | | |
|---|---|---|---|
| 3,443,661 | 5/1969 | Van Sciver . | |
| 3,693,123 | 9/1972 | Pederson | 341/27 |
| 4,486,689 | 12/1984 | Davis et al. | 315/92 |
| 4,518,961 | 5/1985 | Davis et al. | 340/825.44 |
| 4,577,735 | 3/1986 | Mooney et al. . | |
| 4,578,612 | 3/1986 | Mooney et al. . | |
| 4,596,899 | 6/1986 | Wojcik et al. | 381/68.4 |
| 4,641,370 | 2/1987 | Oyamada | 455/348 |
| 4,694,555 | 9/1987 | Russell et al. . | |

OTHER PUBLICATIONS

Application No. 07/878,126, filed May 4, 1992 by Tribbey et al., entitled "Circuit Supporting Mechanical Shock Isolation".

*Primary Examiner*—Donald J. Yusko
*Assistant Examiner*—Edwin C. Holloway, III
*Attorney, Agent, or Firm*—Gregg E. Rasor

[57] ABSTRACT

An electronic device (100) includes a housing (222), a circuit supporting substrate (604, 605) within the housing (222) and mechanically coupled thereto, and electronic circuitry (606, 607, 608, 609, 610) mechanically coupled to the circuit supporting substrate (604, 605). A battery retainer (601) is located within the housing (222), and is mechanically coupled to the housing (222) for positioning and securing a battery (603) and preventing the transmission of mechanical shock between the battery (603) and nearby mechanical elements (240, 242, 604, 605, 606, 607, 608, 609, 610). The battery retainer includes at least one integrally molded user actuated switch (602) for controlling an operating function of the electronic device (100).

10 Claims, 4 Drawing Sheets

BATTERY RETAINER WITH INTEGRAL MECHANICAL SHOCK ISOLATION

FIELD OF THE INVENTION

This invention relates generally to mechanical shock isolation in electronic devices, and more particularly, to a battery retainer with integral mechanical shock isolation for protecting the electronic device.

BACKGROUND OF THE INVENTION

Reliability of operation is an important consideration for modern electronic devices, e.g., selective call receivers. One aspect of reliability is the device's ability to continue to function properly after sudden mechanical impacts and shocks, e.g., dropping the unit onto a hard surface. Modern selective call receivers, e.g., pagers, generally include relatively thin printed circuit boards, housings which are typically made of a plastic type material, and fragile electronic components. The plastic housing's front and back planes and internal printed circuit boards mounted within the housing typically have a low mechanical frequency response to sudden impacts, resulting in relatively large deflections. The deflecting front and back planes, as well as the deflecting printed circuit boards, can impact with each other, resulting in primary and secondary impacts with the components supported by the printed circuit boards. Certain ones of these components are fragile in nature, e.g., constructed of quartz, ceramic, and silicon, making them especially susceptible to failure due to mechanical shocks. Additionally, each of these components also has a natural mechanical frequency response to impact that can amplify the incoming shock and cause serious damage to the component.

Furthermore, modern low volumetric selective call receivers do not permit height tolerances between the printed circuit boards and the housing front and back surfaces to accommodate large deflections. As a result, sudden mechanical shocks typically cause primary and secondary impacts between the deflecting structures. Moreover, any large mass objects such as a battery, contained within the housing of the electronic device, will tend to resist motion due to their inertia, frequently causing secondary shocks and often catastrophic mechanical failure in areas proximate to their location. All of these effects can result in unit failures.

As an example, large impacts, whether primary or secondary, can create detached or broken solder joints in integrated circuits, ceramic filters, and other components. Further, excessive printed circuit board deflections can overstress and fatigue solder joints resulting in failure.

The current method of providing shock isolation within a selective call receiver is to place one or more pieces of shock isolating material in selected areas, usually along stiffeners (e.g., such as ribs in an airplane wing, portions that are added for rigidity that tend to resonate) or the like. Unfortunately, this approach provides a limited amount of shock isolation in a single direction only, and does not solve all of the problems described above. Further, if during manufacturing of the selective call receiver, the shock isolating material is not correctly placed or missing, the final delivered product is again susceptible to failures due to mechanical shock as discussed above.

Thus, what is needed is an apparatus for isolating shock sensitive portions of the electronic device from primary and secondary mechanical shock, thus reducing the resulting deflections of the device's constituent parts and improving reliability over the device's operating lifetime.

SUMMARY OF THE INVENTION

Briefly, according to the invention, there is provided an electronic device, comprising a housing, a circuit supporting substrate within the housing and mechanically coupled thereto, electronic circuitry mechanically coupled to the circuit supporting substrate, and a battery retainer mechanically coupled to the housing for positioning and securing a battery and preventing the transmission of mechanical shock between the battery and mechanical elements proximate thereto, the battery retainer including at least one integrally molded user actuated switch for controlling an operating function of the electronic device.

DESCRIPTION OF A PREFERRED EMBODIMENT

Figure 1:
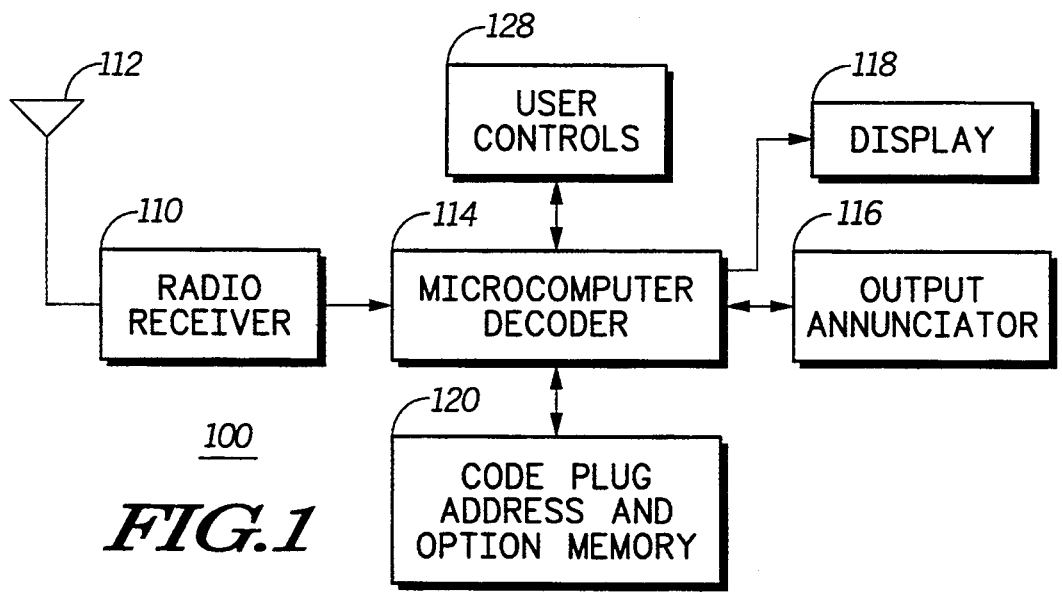
FIG. 1 is a block diagram of a paging receiver in accordance with the preferred embodiment of the present invention.

FIG. 1 is an electrical block diagram of a selective call receiver, e.g. a pager 100. It includes radio receiver circuitry 110 which receives signals via an antenna 112. The received signals include paging information. Selective call receivers can respond to transmitted information containing various combinations of tone, tone and voice, or data messages in a variety of modes. This information may be transmitted using several paging coding schemes and message formats.

The output of the radio receiver circuitry 110 is applied to a microcomputer decoder 114 which processes the information contained in the received signals, to decode any received message. As can be seen, the microcomputer decoder 114 communicates with an output annunciator 116, such as a transducer or speaker, to alert a user that a message has been received, with a display 118, such as a liquid crystal display (LCD), to present a message via the display 118, and with a code plug address and option memory 120 to retrieve predetermined address and function information. Normally, after a received address matches a predetermined address in the pager 100, the output annunciator 116 alerts the user that a message has been received. The user can activate user controls 128, such as buttons or switches, to invoke functions in the pager 100, and optionally to view the received message on the display 118. The operation of a paging receiver of the general type shown in FIG. 1 is well known and is more fully described in U.S. Pat. No. 4,518,961, issued May 21, 1985, entitled "Universal Paging Device with Power Conservation", which is assigned to the same assignee as the present invention and is incorporated herein by reference.

Figure 2:
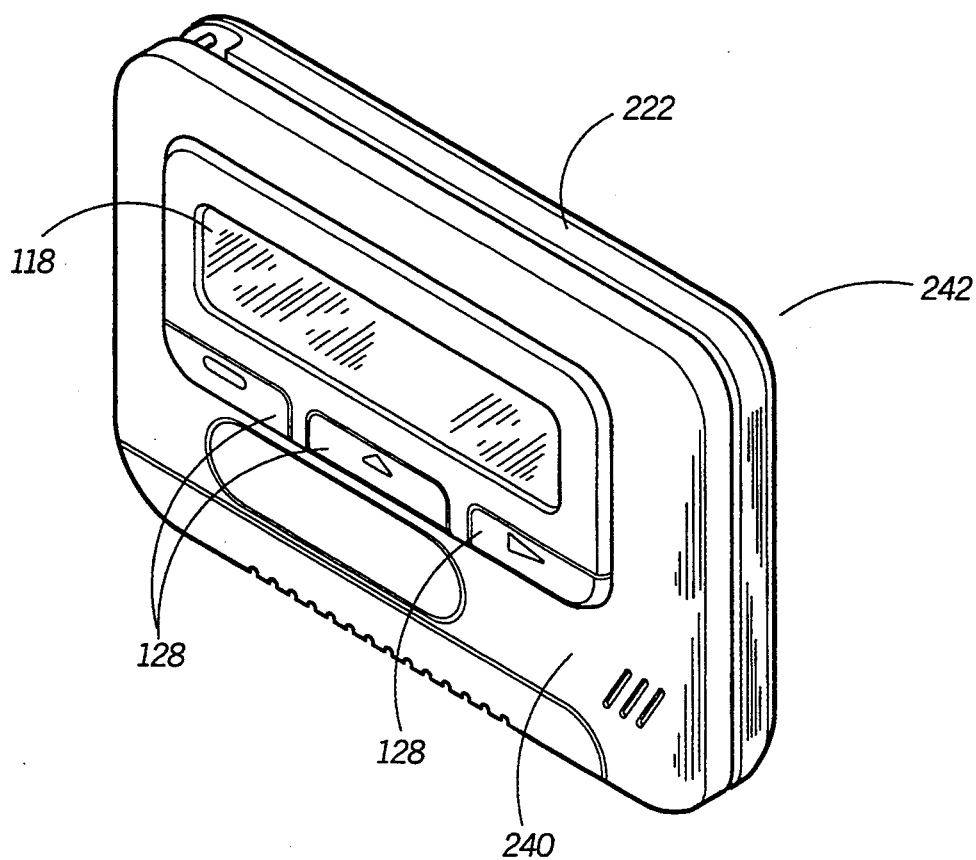
FIG. 2 is an isometric view of a conventional paging receiver in accordance with the preferred embodiment of the present invention.

FIG. 2 is an isometric view of a conventional paging receiver. As can be seen, the pager includes a housing 222, a display 118 that is visible through an aperture in the top 240, and user operated controls 128.

Figure 3:
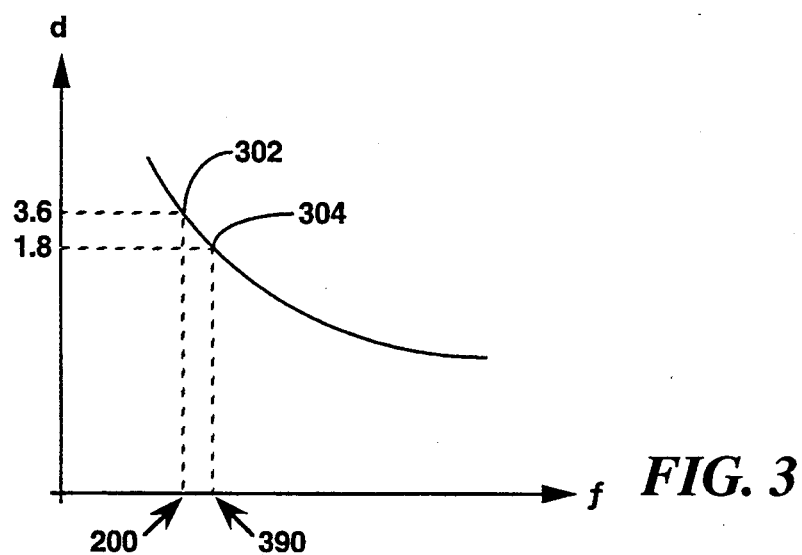
FIG. 3 is a graph illustrating deflection of the mechanical circuit supporting substrates (d) versus the natural mechanical frequency response (f) of the exemplary mechanical system.
Figure 4:
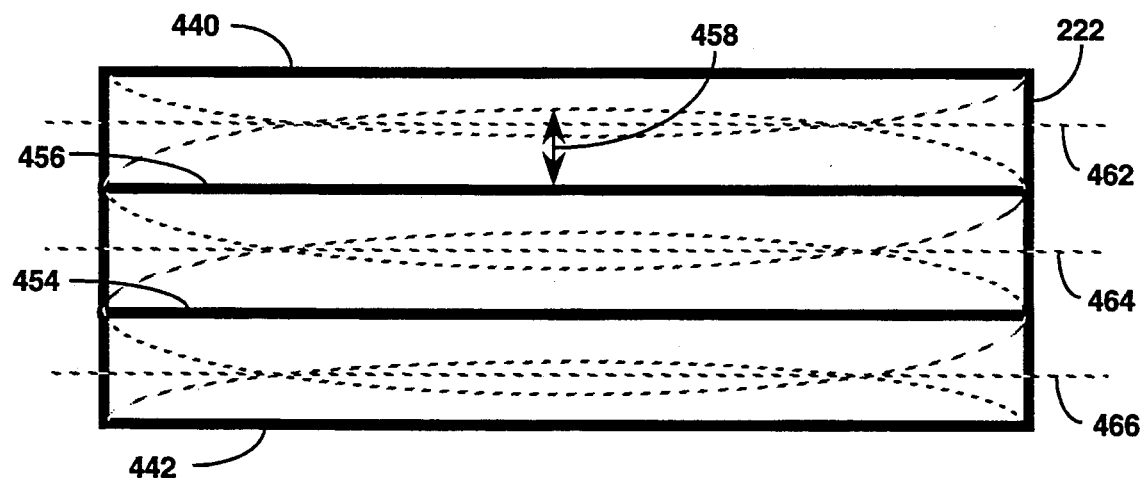
FIG. 4 is a cross-sectional view of a pager housing having front and back planes and two circuit supporting substrates, illustrating deflections and secondary impact zones.

FIG. 3 is a graph illustrating the relationship between deflection due to an impulse from a mechanical shock and the natural mechanical frequency response of a structure. Also, FIG. 4 is a cross-sectional view of the pager housing 222 having two circuit supporting substrates, 454, 456, that are mechanically coupled to the housing 222. For the graph, the impulse from the mechanical shock is kept relatively constant, such as representing a 1.2 meter drop onto a concrete and steel floor. The X-axis on the graph corresponds to the natural mechanical frequency ($f$) of a structure, such as circuit supporting substrates 454, 456, (FIG. 4) mechanically coupled to the housing 222, and the front 240 and back surfaces 242 of the housing 222. The Y-axis on the chart corresponds to the deflection of the structure due to the impulse. Conceptually, the deflections are like the deflections of a guitar string when plucked, i.e., imparted with an impulse. For example, the circuit supporting substrates 454, 456, may have a natural frequency of vibration ranging from 200 to 300 Hz, resulting in a deflection 302 (FIG. 3) of approximately 3.6 mm. The natural vibration frequency response of the housing front and back planes 240, 242 may be approximately 390 Hz, resulting in a deflection 304 of approximately 1.8 mm. The frequency of the vibration may be determined by the impulse response of the complete mechanical system and is typically a function of the stiffness of the components and their mechanical arrangement (geometry). The magnitude of the deflection is a function of the amount of energy imparted to the system by the shock, the energy usually being measured in g's (units of gravity or more commonly, acceleration). Thus, in considering a system such as that illustrated in FIGS. 4 and 5, the frequency of resonance will remain relatively fixed versus energy imparted to the system while the deflection will increase with a corresponding increase in mechanical shock.

FIG. 4 is a cross-sectional view of the pager housing 222 having front 240 and back surfaces 242. Further, two circuit supporting substrates 454, 456, are mechanically coupled to the housing 222. The circuit supporting substrates, 454, 456, are shown deflecting 458 approximately 3.6 mm, in response to a mechanical shock impulse on the pager housing 222, representative of a 1.2 meter drop of the pager housing 222 onto a concrete and steel floor. The front 240 and back surfaces 242 of the housing 222, similarly, are shown deflecting approximately 1.8 mm in response to the same mechanical shock. As can be seen, several secondary impact zones 462, 464, 466, are created due to the large deflections of the structures in the pager housing 222. Hence, for example, any components mechanically coupled to the circuit supporting substrates 454, 456, are subjected not only to the primary impact due to the 1.2 meter drop of the pager housing 222, but they are also subjected to secondary impacts. These primary and secondary impacts can result in damage to components which result in unit failures, as discussed earlier. Therefore, it is desirable to eliminate this phenomena to enhance the reliability of the electronic device.

The preferred embodiment of the present invention decreases transmitted mechanical shock by mechanically isolating the battery which is typically the most significant moveable mass within the pager. By damping external mechanical impulses and preventing their transmission to the battery, secondary shocks due to the movement of the battery are minimized thus protecting the circuit substrates and related components from damage. In addition to preventing secondary mechanical impulses due in part to the battery's large mass, the isolator is designed to firmly capture the battery, thus preventing electrical contact bounce that would cause an interruption of power to the receiver and decoder circuitry. Furthermore, the integrated mechanical shock isolator and battery retainer acts to attenuate energy resulting from the shock impulse in multiple planes whereas conventional planar shock pads merely attenuate energy in a single fixed direction. The result is a significant improvement in a product's resistance to breakage during a mechanical drop and a corresponding increase in reliability.

Figure 5:
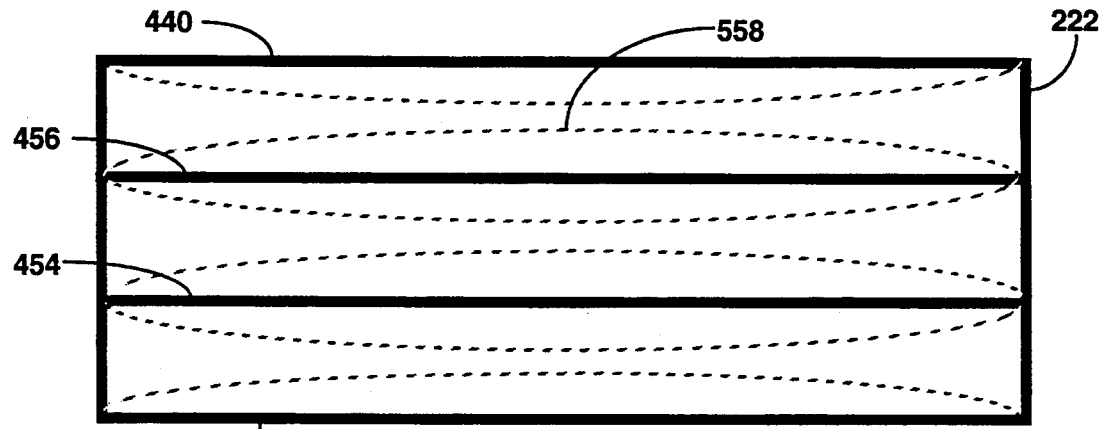
FIG. 5 is a cross-sectional view of a pager housing having front and back surfaces and two circuit supporting substrates, illustrating deflections with no secondary impact zones, according to the present invention.

FIG. 5 illustrates the front 240 and back surfaces 242 of the pager housing 222, and the two circuit supporting substrates 454, 456, deflecting with no secondary impact zones. As shown, the circuit supporting substrate 456 deflects 558 only approximately 0.3 mm, while it previously deflected 458 (FIG. 4), 3.6 mm. Similarly, the front and back surfaces 240, 242, are shown deflecting approximately 0.3 mm, while they previously deflected approximately 1.8 mm. The improvement is attained by suppressing the magnitude of mechanical shock transmitted to the circuit supporting substrates 454, 456, and reflected between the front and back surfaces 240, 242, of the housing 222.

Figure 6:
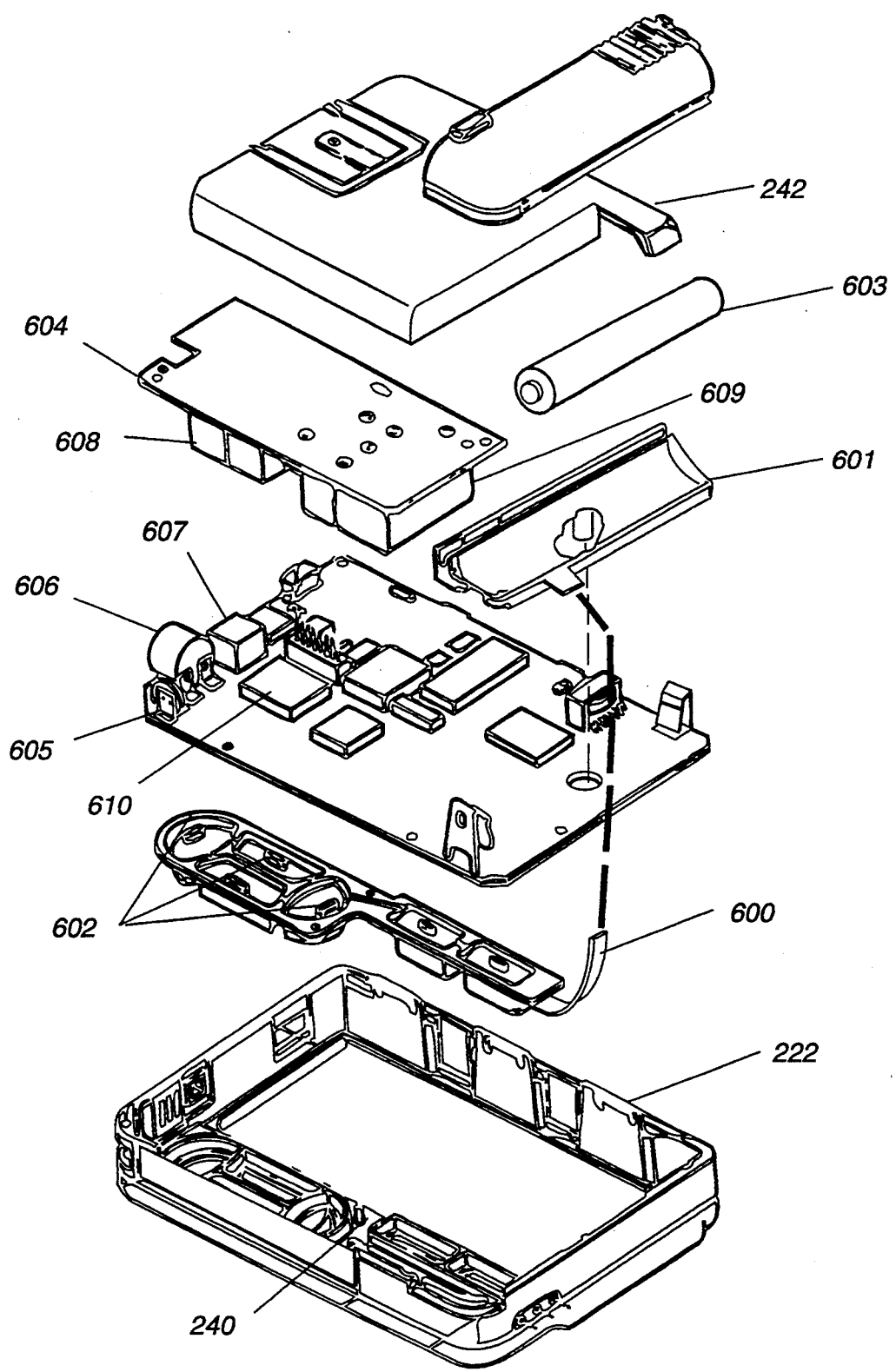
FIG. 6 is an isometric view of a first embodiment of an integrated mechanical shock isolator and battery retainer for use in accordance with the present invention.

FIG. 6 is an isometric view of a first embodiment of an integrated mechanical shock isolator and battery retainer 600 for use in accordance with the preferred embodiment of the present invention. The integrated mechanical shock isolator and battery retainer 600 is preferably molded from a material having a desired durometer and damping characteristics so as to raise a natural frequency of vibration (and therefore reduce the amount of deflection due to shock) of a selective call receiver housing and a circuit supporting substrate or printed circuit board when coupled thereto. The integrated mechanical shock isolator and battery retainer 600 may be manufactured by molding elastomeric materials, such as polyurethane or butyl rubber. However, any elastomeric materials possessing the required characteristics of damping and stiffness are suitable for use in accordance with the teachings of the present invention. In accordance with the preferred embodiment of the present invention, the material should have a damping factor of at least 25% (preferably 50%) and exhibit a durometer of between 50 to 70 (type A), and preferably 60 (type A). Further, the integrated mechanical shock isolator and battery retainer's 600 material should be free of sulfur or other contaminants that might attack components associated with the pager; free of carbon or compounds with like electrical properties (e.g., conductivity); and free of other compounds that may attack or degrade the material (e.g., polycarbonate or the like) used in manufacturing the pager housing.

Butyl rubber is a one preferred material, which provides superior results. One advantage of using butyl rubber is its tolerance to high temperatures used during reflow soldering in assembling the pager. Alternatively, silicon rubber can be used for manufacture since it also exhibits characteristics within the parameters set forth above. Some alternatives for the product manufacturing and assembly process will be discussed below.

The integrated mechanical shock isolator and battery retainer 600 in FIG. 6 comprises a battery retainer 601 and a plurality of molded elastomeric switch elements 602. The battery retainer 601 serves to locate and secure a battery 603 or like power source. Each switch element 602 may include a conductive elastomeric contact for completing an electrical circuit upon actuation (e.g., compression followed by contact) of a respective switch function. The combining of these items into a single article of manufacture has the additional benefit of reducing the cost of the completed assembly since the assembly efficiency is improved by reducing the number of assembly operations as well as lowering the overall part count in the pager, thus improving reliability.

FIG. 6 also illustrates exemplary first and second circuit supporting substrates (printed circuit boards) 604, 605 that may be made analogous to those depicted in FIGS. 4 and 5 as the two circuit supporting substrates 454, 456. At least a portion of the electronic circuitry for the pager 100 is shown as components 606, 607, 608, 609, 610, mounted on the printed circuit boards 604, 605. These components 606, 607, 608, 609, 610, may include the radio receiver circuitry 110 (FIG. 1), the microcomputer decoder 114, and the output annunciator 116, as well as other electronic circuitry performing functions for the pager 100. Additionally, while two printed circuit boards 604, 605, are shown for convenience, it should be clear that the electronic device could include less than or more than two circuit supporting substrates or printed circuit boards.

Figure 7:
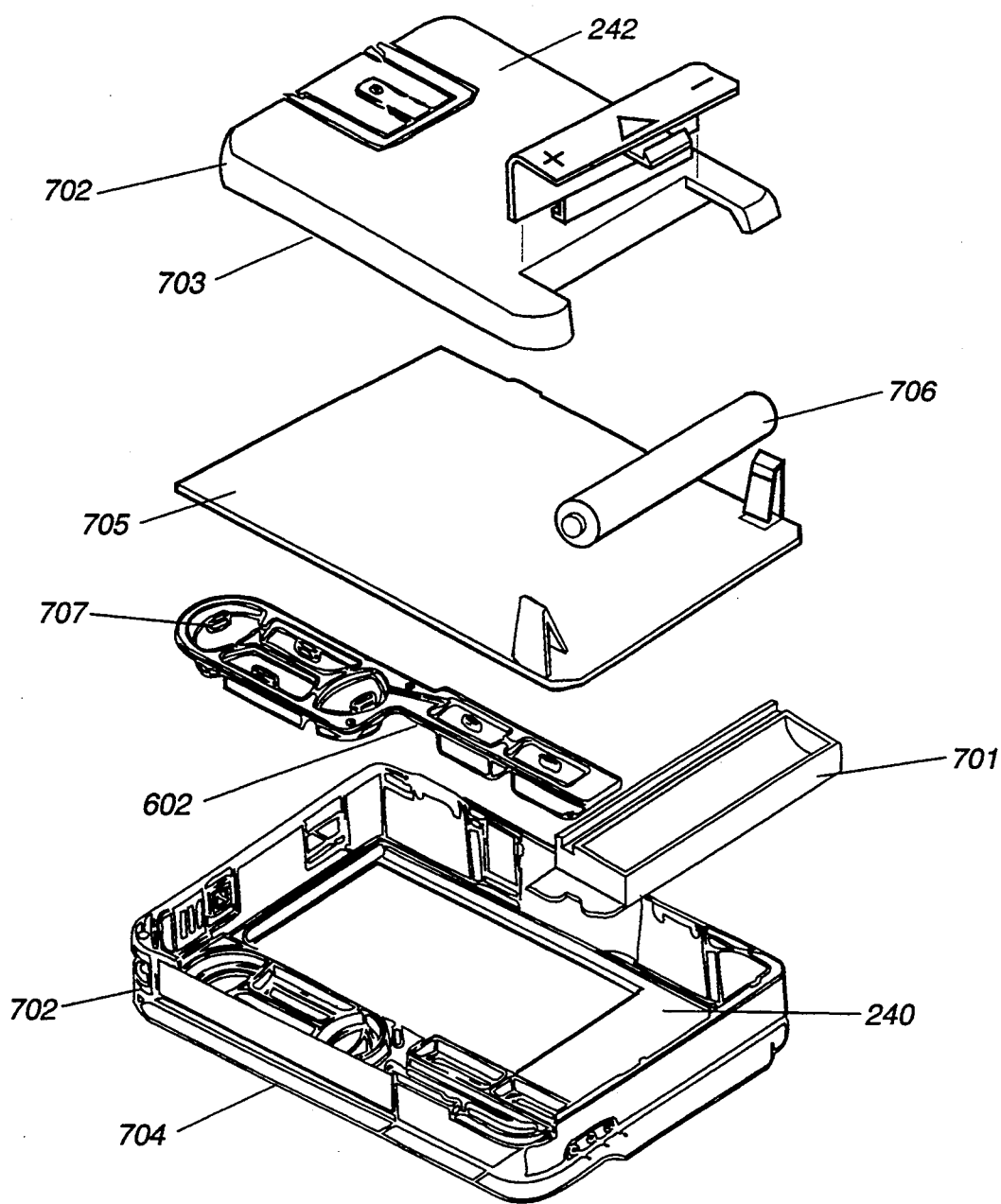
FIG. 7 is an isometric view of a second embodiment of an integrated mechanical shock isolator and battery retainer for use in accordance with the present invention.

Referring to FIG. 7, the illustration shows a second embodiment of an integrated mechanical shock isolator and battery retainer 700 utilizing a "Z-axis" or in-line installation design. This embodiment may be more ideally suited for robotic assembly since the battery retainer 701 does not need to be articulated as did the retainer 601 shown in FIG. 6. Moreover, FIG. 7 shows a selective call receiver that uses only a single circuit supporting substrate 702.

The selective call receiver in FIG. 7 comprises a housing 702 including a first 703 and second 704 portion, a circuit supporting substrate 705 within the housing and mechanically coupled thereto; electronic circuitry such as that detailed in FIG. 6, at least a portion of which being mechanically coupled to the circuit supporting substrate, and the battery retainer 701 mechanically coupled to the housing 702 for positioning and securing a battery 706 and preventing the transmission of mechanical shock between the battery 706 and mechanical elements proximate thereto such as the housing 702, circuit supporting substrate 705, or the like. The battery retainer further includes at least one integrally molded user actuated switch 707 for controlling an operating function of the selective call receiver 100.

Accordingly, an electronic device that uses the integrated mechanical shock isolator and battery retainer will be more reliable because less mechanical shock will be transmitted to the circuit supporting substrates 454, 456, their associated electronic components, and the housing 222. Furthermore, the battery retainer will function to more securely retain the battery in its desired position against the power contacts, thus reducing electrical failures due to intermittent electrical connections.

What is claimed is:

1. An electronic device, comprising:
    a housing;
    a circuit supporting substrate within the housing and mechanically coupled thereto;
    electronic circuitry mechanically coupled to the circuit supporting substrate; and
    a battery retainer mechanically coupled to the housing for positioning and securing a battery therein and preventing the transmission of mechanical shock between the battery and the housing, circuit supporting substrate, electronic circuitry, and mechanical elements proximate thereto, the battery retainer including at least one integrally molded user actuated switch for controlling an operating function of the electronic device.

2. The electronic device of claim 1 wherein the battery retainer is mechanically coupled to the circuit supporting substrate so as to substantially reduce transmission of mechanical shock between the battery and the circuit supporting substrate, thereby protecting the electronic circuitry on the circuit supporting substrate from damage by mechanical shock.

3. The electronic device of claim 1 wherein the at least one integrally molded user actuated switch for controlling an operating function of the electronic device includes at least one electrical contact, and the circuit supporting substrate includes at least one electrical contact coupled to the electronic circuitry for sensing actuation of the at least one integrally molded user actuated switch.

4. The electronic device of claim 1 wherein the battery retainer and the at least one integrally molded user actuated switch comprise an elastomeric material having a damping factor of at least 25% and a durometer of between 50 and 70, type A.

5. The electronic device of claim 4 wherein the elastomeric material consists of material from at least one of the set of butyl rubber and polyurethane and silicon rubber.

6. A selective call receiver for receiving transmitted messages, comprising:
    a housing;
    a circuit supporting substrate within the housing and mechanically coupled thereto;
    electronic circuitry, at least a portion of which being mechanically coupled to the circuit supporting substrate, comprising:
        receiving means for receiving a message comprising an address;
        decoding means coupled to the receiving means for decoding the received message, and for determining if the received address matches a predetermined address; and alert means coupled to the decoding means for generating an alert if the received address matches the predetermined address; and a battery retainer mechanically coupled to the housing for positioning and securing a battery therein and preventing the transmission of mechanical shock between the battery and the housing, circuit supporting substrate, electronic circuitry, and mechanical elements proximate thereto, the battery retainer including at least one integrally molded user actuated switch for controlling an operating function of the selective call receiver.

7. The selective call receiver of claim 6 wherein the battery retainer is mechanically coupled to the circuit supporting substrate so as to substantially reduce transmission of mechanical shock between the battery and the circuit supporting substrate, thereby protecting the electronic circuitry on the circuit supporting substrate from damage by mechanical shock.

8. The selective call receiver of claim 6 wherein the at least one integrally molded user actuated switch for controlling an operating function of the selective call receiver includes at least one electrical contact, and the circuit supporting substrate includes at least one electrical contact coupled to the electronic circuitry for sensing actuation of the at least one integrally molded user actuated switch.

9. The selective call receiver of claim 6 wherein the battery retainer and the at least one integrally molded user actuated switch comprise an elastomeric material having a damping factor of at least 25% and a durometer of between 50 and 70, type A.

10. The selective call receiver of claim 9 wherein the elastomeric material consists of material from at least one of the set of butyl rubber and polyurethane and silicon rubber.

* * * * *